(12) United States Patent
Zhou et al.

(10) Patent No.: US 11,192,328 B2
(45) Date of Patent: Dec. 7, 2021

(54) FIRE-RESISTANT THERMOPLASTIC MEMBRANE COMPOSITE AND METHOD OF MANUFACTURING THE SAME

(71) Applicant: Firestone Building Products Company, LLC, Nashville, TN (US)

(72) Inventors: Wensheng Zhou, Carmel, IN (US); Donna Tippmann, Fishers, IN (US); Michael P. Allen, Noblesville, IN (US)

(73) Assignee: Firestone Building Products Company, LLC, Nashville, TN (US)

( * ) Notice: Subject to any disclaimer, the term of this patent is extended or adjusted under 35 U.S.C. 154(b) by 81 days.

(21) Appl. No.: 16/099,508

(22) PCT Filed: May 11, 2017

(86) PCT No.: PCT/US2017/032195
§ 371 (c)(1),
(2) Date: Nov. 7, 2018

(87) PCT Pub. No.: WO2017/197136
PCT Pub. Date: Nov. 16, 2017

(65) Prior Publication Data
US 2019/0105868 A1  Apr. 11, 2019

Related U.S. Application Data

(60) Provisional application No. 62/334,835, filed on May 11, 2016.

(51) Int. Cl.
*B32B 5/10* (2006.01)
*B32B 5/30* (2006.01)
(Continued)

(52) U.S. Cl.
CPC ........... *B32B 5/10* (2013.01); *B32B 5/022* (2013.01); *B32B 5/145* (2013.01); *B32B 5/16* (2013.01); *B32B 5/30* (2013.01); *B32B 9/007* (2013.01); *B32B 9/045* (2013.01); *B32B 9/047* (2013.01); *B32B 27/12* (2013.01); *B32B 27/304* (2013.01); *B32B 27/306* (2013.01); *B32B 27/308* (2013.01); *B32B 27/32* (2013.01);
(Continued)

(58) Field of Classification Search
CPC ................................ B32B 27/12; B32B 5/10
See application file for complete search history.

(56) References Cited

U.S. PATENT DOCUMENTS

| | | | | |
|---|---|---|---|---|
| 4,491,617 A | * | 1/1985 | O'Connor | B32B 5/08 442/32 |
| 2014/0013693 A1 | * | 1/2014 | Zhou | C08L 95/00 52/408 |

(Continued)

OTHER PUBLICATIONS

International Search Report for corresponding PCT/US2017/032195 dated Aug. 21, 2017.

*Primary Examiner* — Alexandre F Ferre
(74) *Attorney, Agent, or Firm* — Renner, Kenner; Arthur M. Reginelli (57) ABSTRACT

A thermoplastic membrane composite comprising (i) a planar thermoplastic body having first and second opposed planar surfaces; (ii) a fabric backing fixedly attached to said first planar surface thereby forming an interface between said thermoplastic body and said fabric backing; and (iii) expandable graphite disposed at or near the interface.

9 Claims, 4 Drawing Sheets

(51) Int. Cl.

| | |
|---|---|
| *B32B 27/12* | (2006.01) |
| *B32B 27/32* | (2006.01) |
| *B32B 5/16* | (2006.01) |
| *B32B 27/30* | (2006.01) |
| *B32B 9/04* | (2006.01) |
| *E04D 5/10* | (2006.01) |
| *B32B 5/14* | (2006.01) |
| *E04D 5/14* | (2006.01) |
| *B32B 5/02* | (2006.01) |
| *B32B 9/00* | (2006.01) |

(52) U.S. Cl.
CPC ............... *E04D 5/10* (2013.01); *E04D 5/143* (2013.01); *E04D 5/144* (2013.01); *B32B 2260/021* (2013.01); *B32B 2260/025* (2013.01); *B32B 2260/046* (2013.01); *B32B 2262/0253* (2013.01); *B32B 2262/0284* (2013.01); *B32B 2262/101* (2013.01); *B32B 2264/108* (2013.01); *B32B 2274/00* (2013.01); *B32B 2307/3065* (2013.01); *B32B 2307/718* (2013.01); *B32B 2419/06* (2013.01)

(56) References Cited

U.S. PATENT DOCUMENTS

| | | |
|---|---|---|
| 2014/0205789 A1 | 7/2014 | Zhou et al. |
| 2014/0215937 A1 | 8/2014 | Zhou et al. |
| 2015/0197884 A1 | 7/2015 | Zhou et al. |

* cited by examiner

FIRE-RESISTANT THERMOPLASTIC MEMBRANE COMPOSITE AND METHOD OF MANUFACTURING THE SAME

This application is a National-Stage application of PCT/US2017/032195 filed on May 11, 2017, which claims the benefit of U.S. Provisional Application Serial No. 62/334,835 filed on May 11, 2016, which are incorporated herein by reference.

FIELD OF THE INVENTION

Embodiments of the present invention are directed toward fire-resistant thermoplastic membrane composites. Other embodiments are directed toward methods for making these composites. And other embodiments are directed toward roof systems that include these composites.

BACKGROUND OF THE INVENTION

As is known in the art, roofs can be rated according to UL 790 or ASTM E 108 standards for fire resistance. A Class A roof has the highest resistance to fire. An unrated roof has the lowest resistance to fire, and Class B and Class C rated roofs are rated therebetween, respectively. These ratings are generally based upon flame penetration into the attic space through the roof covering, flame spread over the surface of the roof covering, and the propensity for the roof covering to become dislodged and generate embers.

Certain non-combustible roof decks can achieve a Class A rating by virtue of their construction. For example, a concrete deck typically achieves a Class A rating. Other roofs, such as those carrying an aluminum covering, may require complementary materials to achieve a Class A rating. For example, a fire resistant asphaltic underlayment may be placed under an aluminum roof covering to achieve a Class A rating.

Where the roof deck is a combustible deck, such as a wood deck, it can be extremely difficult to achieve a Class A rating. In many situations, robust and expensive underlayment is required to achieve a Class A rating over a combustible deck. For example, fiberglass-backed gypsum board (e.g., DensDeck™) can be applied over a combustible deck to achieve a Class A rating. Alternatively, or in addition thereto, a heavy underlayment (e.g., 72 pound felt or cap sheet) may be required to achieve a Class A rating over a wood roof deck.

The difficulty in achieving a Class A rating can be further complicated by the type of roof covering employed over the combustible deck. Where a roof covering is metal (e.g., aluminum), the complementary construction material, such as an underlayment, may not need to be as robust to achieve a Class A rating. On the other hand, where the roof covering is a polymeric membrane (e.g., a thermoplastic sheet), the ability to achieve a Class A rating over a combustible deck is not trivial.

SUMMARY OF THE INVENTION

One or more embodiments of the present invention provide a thermoplastic membrane composite comprising (i) a planar thermoplastic body having first and second opposed planar surfaces; (ii) a fabric backing fixedly attached to said first planar surface thereby forming an interface between said thermoplastic body and said fabric backing; and (iii) expandable graphite disposed at or near the interface.

Yet other embodiments of the present invention provide A process for forming a thermoplastic membrane composite, the process comprising (i) extruding a first thermoplastic layer; (ii) extruding a second thermoplastic layer; (iii) positioning a reinforcing fabric between the first thermoplastic layer and the second thermoplastic layer; (iv) providing a fabric backing; (v) applying expandable graphite to a first planar surface of the fabric backing; (vi) positioning the first planar surface of the fabric backing adjacent to a surface of the second thermoplastic layer opposite the reinforcing fabric to thereby sandwich the expandable graphite between the fabric backing and the second thermoplastic layer; (vii) laminating the first thermoplastic layer to the second thermoplastic layer to thereby sandwich the reinforcing scrim therebetween; and (viii) thermally bonding the second thermoplastic layer to the fabric backing.

DETAILED DESCRIPTION OF ILLUSTRATIVE EMBODIMENTS

Embodiments of the invention are based, at least in part, on the discovery of a thermoplastic membrane composite that demonstrates improved fire-resistant properties as a result of the presence and location of expandable graphite within the composite. In one or more embodiments, the composites include a fabric backing, and the expandable graphite is generally sandwiched between a surface of the membrane and the fabric backing. These and other embodiments are also based, at least in part, on the discovery of a method of preparing thermoplastic membrane composites that includes applying expandable graphite to a surface of a fabric backing and then thermally mating the fabric backing to a surface of a thermoplastic membrane sheet. Advantageously, it has been unexpectedly discovered that expandable graphite can be placed into contact with a thermoplastic extrudate at a temperature above the melt temperature of the extrudate without having a deleterious impact on the expandable graphite. Additionally, it has unexpectedly been discovered that a fabric backing can be thermally bonded to a thermoplastic membrane while sandwiching expandable graphite between the fabric backing and the thermoplastic membrane. Additionally, the membrane composites of one or more embodiments can be used to create a Class A roof system over a combustible desk.

Composite Construction Structure

Figure 1:
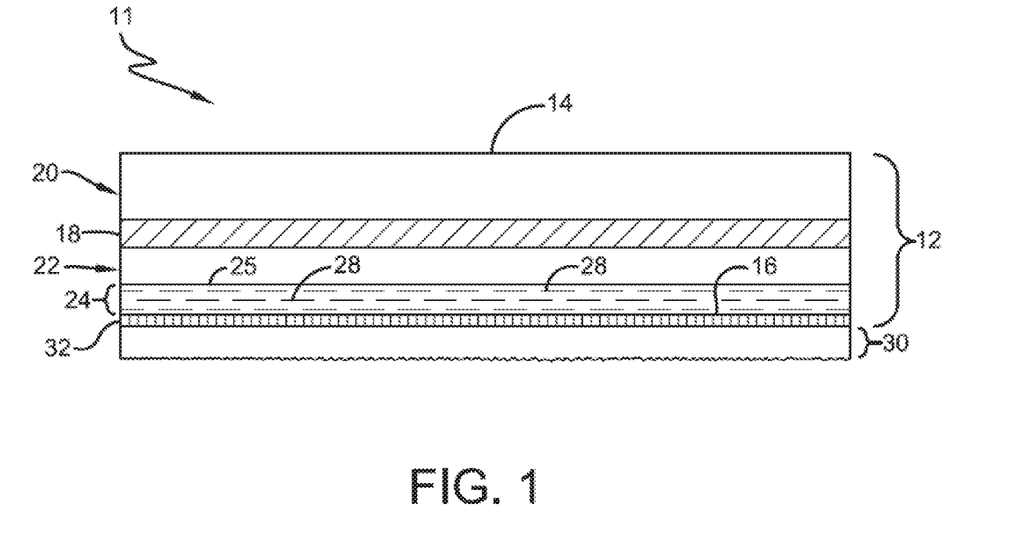
FIG. 1 is a cross-sectional view of a thermoplastic membrane composite according to embodiments of the invention.
Figure 2:
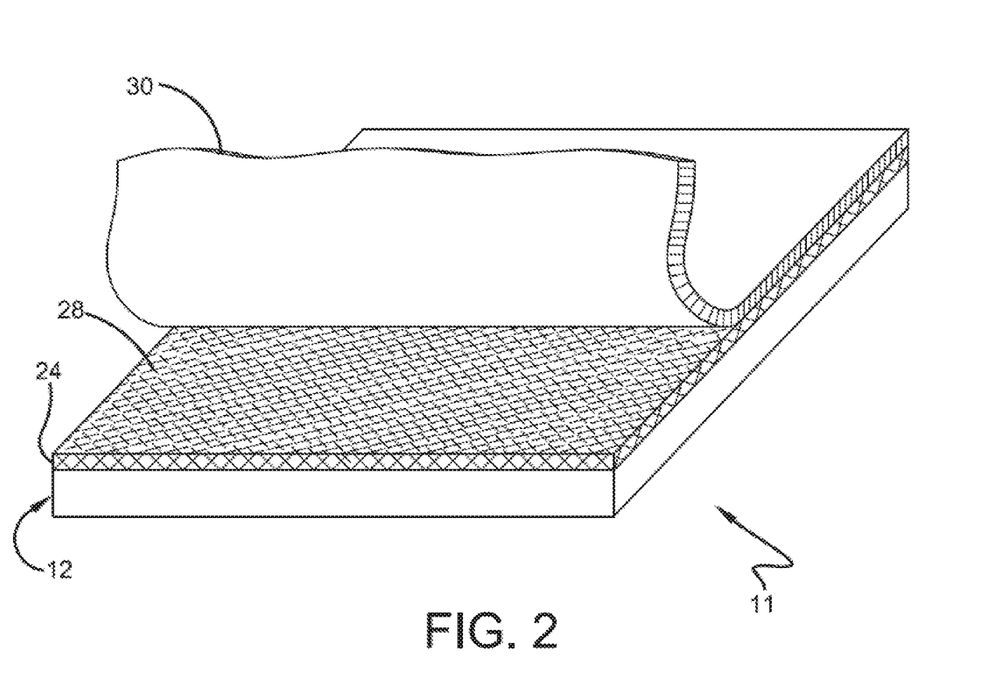
FIG. 2 is a perspective, exposed view of a thermoplastic membrane composite according to embodiments of the present invention.

Thermoplastic membrane composites of the present invention can be described with reference to FIGS. 1 and 2, which show composite 11 including thermoplastic body 12, fabric backing 30, and expandable graphite 28 generally sandwiched between thermoplastic body 12 and fabric backing 30. In one or more embodiments, plastic body 12 may be a multi-layered laminate structure that includes at least two layers 20, 22 laminated to each other. A fabric reinforcement 18 may be disposed between layers 20, 22. In one or more embodiments, at least one of fabric backing 30 and fabric reinforcement 18 is a glass-containing fabric. As the skilled person will appreciate, fabric reinforcement 18 can be positioned between layers 20, 22 prior to thermally laminating layers 20, 22 to each other. In one or more embodiments, fabric 18 is characterized by sufficient porosity to provide flow of the molten polymer, which forms layers 20, 22, through fabric 18 and thereby permit thermal bonding of layers 20, 22 to each other. In these or other embodiments, a laminate is formed by adhesion to the fabric.

In one or more embodiments, thermoplastic layers 20, 22 of thermoplastic body 12 may include multiple layers. For example, upper layer 20 may include two or more thermoplastic layers. In one or more embodiments, these layers may include co-extruded layers.

In one or more embodiments, layer 20 may be referred to as upper layer 20 inasmuch as this layer, and more precisely upper surface 14 of layer 20, is exposed to the environment when installed. Layer 22 may be referred to as lower layer 22 since this layer is proximate to the roof surface, relative to upper layer 20, when installed. Lower layer 22 includes bottom surface 16, which is fixedly attached, via thermal bonding, to fabric backing 30.

In one or more embodiments, expandable graphite 28 is included (i.e. located) within a lower region 24 of layer 22 proximate bottom surface 16. Expandable graphite may also be located on surface 16 of lower layer 22. As will be explained in greater detail below, expandable graphite 28 is located within lower region 24 and on surface 16 of lower layer 22 as a result of the method by which the composites are prepared. For example, a method may be employed whereby expandable graphite particles are contacted with surface 16 of thermoplastic body 12 while thermoplastic polymer within thermoplastic body 12 is above the melt temperature of the thermoplastic polymer. The amount of expandable graphite applied or contacted to surface 16 in combination with the temperature of the thermoplastic polymer allows the thermoplastic polymer at or near surface 16 to flow around the individual particles of expandable graphite. As a result, some of the expandable graphite particles become dispersed within the thermoplastic polymer, which acts as a matrix enveloping one or more of the expandable graphite particles. In these or other embodiments, expandable graphite particles contact adjoining expandable graphite particles and form a co-continuous layer of expandable graphite particles within a continuous thermoplastic matrix. Still other expandable graphite particles may be adhered to thermoplastic body 12 at surface 16, which results in the expandable graphite particles being at least partially exposed at surface 16. In one or more embodiments, surface 16 is a heterogeneous surface that includes both expandable graphite particles and thermoplastic polymer.

In one or more embodiments, and again deriving from the manner in which the composites are prepared, lower region 24 of lower layer 22 may include a concentration gradient of expandable graphite where expandable graphite is at maximum concentration at or near surface 16 and a minimum concentration at or near an opposite plane 25 of region 24.

As suggested above, a fabric backing 30 is fixedly attached to thermoplastic body 12 at or near surface 16. As a skilled person will appreciate, fixedly attached refers to the fact that fabric 30 cannot be separated from thermoplastic body 12 when subjected to ordinary forces encountered during ordinary use (e.g., ordinary wind uplift forces). As also indicated above, fabric 30 is fixedly attached to thermoplastic body through thermal bonding. As a skilled person appreciates, thermal bonding includes mating fabric backing 30 to body 12 while thermoplastic polymers within body 12 are heated above the melt temperature of the thermoplastic polymers. As a result, the thermoplastic polymers will flow into the interstices within fabric backing 30, which allows fibers or strands of fabric backing 30 to mechanically interlock into at least a portion of thermoplastic body 12. With respect to FIG. 1, that portion of fabric backing 30 into which thermoplastic polymer flows and mechanically interlocks fibers or strands of fabric backing 30 is shown as interface 32. Additionally, in one or more embodiments, interface 32 may include expandable graphite 28 located therein.

In one or more embodiments, the concentration of expandable graphite 28 within region 24, including the concentration at surface 16, may be quantified based upon the weight (e.g., grams) of expandable graphite applied over the surface area (e.g., $ft^2$) of the fabric. In one or more embodiments, the concentration of expandable graphite within region 24, including surface 16, is greater than 4.5, in other embodiments greater than 7.5, and in other embodiments greater than 10 $g/ft^2$. In one or more embodiments, the concentration of expandable graphite within region 24, including surface 16, is less than 22, in other embodiments less than 20, and in other embodiments less than 18 $g/ft^2$. In these or other embodiments, the concentration of expandable graphite within region 24, including surface 16, is from about 4.5 to about 22, in other embodiments from about 7.5 to about 20, and in other embodiments from about 10 to about 18 $g/ft^2$.

In one or more embodiments, fabric backing 30 is attached to only a portion of the membrane surface (i.e. surface 16). In particular embodiments, a lap edge is maintained in the membrane for seaming adjacent membranes together. This seaming can take place through heat seaming or adhesive seaming. In general, the lap edge could be 2-12" inches in width, although the width can vary depending on preference.

Thermoplastic Membrane Layers

Embodiments of the present invention are not necessarily limited by the composition of the individual thermoplastic layers of the thermoplastic membrane (e.g., layers 20 and 22). In one or more embodiments, the thermoplastic layers may include thermoplastic polyolefins, polyvinyl chloride, ethylene vinylacetate polymers, ethylene alkylacrylate polymers, and the like, and mixtures thereof.

In one or more embodiments, the thermoplastic polyolefin polymers may include an olefinic reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. In one or more embodiments, the in-reactor copolymers may be physically blended with other polyolefins. For example, in reactor copolymers may be blended with linear low density polyethene.

In other embodiments, the thermoplastic polyolefin polymers may include one or more polyolefins such as, but not limited to, propylene-based thermoplastic polymers, plastomers, and/or ethylene-based thermoplastic polymers. In one or more embodiments, the thermoplastic polymer may include a blend of olefinic polymers. Useful blends include those described in International Application No. PCT/US06/033522 which is incorporated herein by reference. For example, a particular blend may include (i) a plastomer, (ii) a low density polyethylene, and (iii) a propylene-based polymer.

In one or more embodiments, propylene-based polymers may include polypropylene homopolymer or copolymers of propylene and a comonomer, where the copolymer includes, on a mole basis, a majority of mer units deriving from propylene. In one or more embodiments, the propylene-based copolymers may include from about 2 to about 6 mole percent, and in other embodiments from about 3 to about 5 mole percent mer units deriving from the comonomer with the remainder including mer units deriving from propylene. In one or more embodiments, the comonomer includes at least one of ethylene and an α-olefin. The α-olefins may include butene-1, pentene-1, hexene-1, octene-1, or 4-methyl-pentene-1. In one or more embodiments, the copolymers of propylene and a comonomer may include random copolymers. Random copolymers may include those propylene-based copolymers where the comonomer is randomly distributed across the polymer backbone.

The propylene-based polymers employed in one or more embodiments of this invention may be characterized by a melt flow rate of from about 0.5 to about 15 dg/min, in other embodiments from about 0.7 to about 12 dg/min, in other embodiments from about 1 to about 10 dg/min, and in other embodiments from about 1.5 to about 3 dg/min per ASTM D-1238 at 230° C. and 2.16 kg load. In these or other embodiments, the propylene-based polymers may have a weight average molecular weight ($M_w$) of from about $1\times10^5$ to about $5\times10^5$ g/mole, in other embodiments from about $2\times10^5$ to about $4\times10^5$ g/mole, and in other embodiments from about $3\times10^5$ to about $4\times10^5$ g/mole, as measured by GPC with polystyrene standards. The molecular weight distribution of these propylene-based copolymer may be from about 2.5 to about 4, in other embodiments from about 2.7 to about 3.5, and in other embodiments from about 2.8 to about 3.2.

In one or more embodiments, propylene-based polymers may be characterized by a melt temperature ($T_m$) that is from about 165° C. to about 130° C., in other embodiments from about 160 to about 140° C., and in other embodiments from about 155° C. to about 140° C. In one or more embodiments, particularly where the propylene-based polymer is a copolymer of propylene and a comonomer, the melt temperature may be below 160° C., in other embodiments below 155° C., in other embodiments below 150° C., and in other embodiments below 145° C. In one or more embodiments, they may have a crystallization temperature ($T_c$) of about at least 90° C., in other embodiments at least about 95° C., and in other embodiments at least 100° C., with one embodiment ranging from 105° to 115° C.

Also, these propylene-based polymers may be characterized by having a heat of fusion of at least 25 J/g, in other embodiments in excess of 50 J/g, in other embodiments in excess of 100 J/g, and in other embodiments in excess of 140 J/g.

In one or more embodiments, the propylene-based polymers may be characterized by a flexural modulus, which may also be referred to as a 1% secant modulus, in excess of 120,000 psi, in other embodiments in excess of 125,000, in other embodiments in excess of 130,000, in other embodiments in excess of 133,000 psi, in other embodiments in excess of 135,000 psi, and in other embodiments in excess of 137,000 psi, as measured according to ASTM D-790.

Useful propylene-based polymers include those that are commercially available. For example, propylene-based polymers can be obtained under the tradename PP7620Z™ (Fina), PP33BF01™ (Equistar), or under the tradename TR3020™ (Sunoco).

In one or more embodiments, plastomers include ethylene-α-olefin copolymers. The plastomer employed in one or more embodiments of this invention includes those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The α-olefin employed in preparing the plastomer of one or more embodiments of this invention may include butene-1, pentene-1, hexene-1, octene-1, or 4-methyl-pentene-1.

In one or more embodiments, plastomers may be characterized by a density of from about 0.865 g/cc to about 0.900 g/cc, in other embodiments from about 0.870 to about 0.890 g/cc, and in other embodiments from about 0.875 to about 0.880 g/cc per ASTM D-792. In these or other embodiments, the density of the plastomers may be less than 0.900 g/cc, in other embodiments less than 0.890 g/cc, in other embodiments less than 0.880 g/cc, and in other embodiments less than 0.875 g/cc.

In one or more embodiments, the plastomer may be characterized by a weight average molecular weight of from about $7\times10^4$ to $13\times10^4$ g/mole, in other embodiments from about $8\times10^4$ to about $12\times10^4$ g/mole, and in other embodiments from about $9\times10^4$ to about $11\times10^4$ g/mole as measured by using GPC with polystyrene standards. In these or other embodiments, the plastomer may be characterized by a weight average molecular weight in excess of $5\times10^4$ g/mole, in other embodiments in excess of $6\times10^4$ g/mole, in other embodiments in excess of $7\times10^4$ g/mole, and in other embodiments in excess of $9\times10^4$ g/mole. In these or other embodiments, the plastomer may be characterized by a molecular weight distribution ($M_w/M_n$) that is from about 1.5 to 2.8, in other embodiments 1.7 to 2.4, and in other embodiments 2 to 2.3.

In these or other embodiments, the plastomer may be characterized by a melt index of from about 0.1 to about 8, in other embodiments from about 0.3 to about 7, and in other embodiments from about 0.5 to about 5 per ASTM D-1238 at 190° C. and 2.16 kg load.

The uniformity of the comonomer distribution of the plastomer of one or more embodiments, when expressed as a comonomer distribution breadth index value (CDBI), provides for a CDBI of greater than 60, in other embodiments greater than 80, and in other embodiments greater than 90.

In one or more embodiments, the plastomer may be characterized by a DSC melting point curve that exhibits the occurrence of a single melting point break occurring in the region of 50 to 110° C.

The plastomer of one or more embodiments of this invention may be prepared by using a single-site coordination catalyst including metallocene catalyst, which are conventionally known in the art.

Useful plastomers include those that are commercially available. For example, plastomer can be obtained under the tradename EXXACT™ 8201 (ExxonMobil); or under the tradename ENGAGE™ 8180 (Dow DuPont). In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a weight average molecular weight of from about $1 \times 10^5$ to about $5 \times 10^5$ g/mole, in other embodiments $2 \times 10^5$ to about $10 \times 10^5$ g/mole, in other embodiments from about $5 \times 10^5$ to about $8 \times 10^5$ g/mole, and in other embodiments from about $6 \times 10^5$ to about $7 \times 10^5$ g/mole as measured by GPC with polystyrene standards. In these or other embodiments, the linear low density polyethylene may be characterized by a molecular weight distribution ($M_w/M_n$) of from about 2.5 to about 25, in other embodiments from about 3 to about 20, and in other embodiments from about 3.5 to about 10. In these or other embodiments, the linear low density polyethylene may be characterized by a melt flow rate of from about 0.2 to about 10 dg/min, in other embodiments from about 0.4 to about 5 dg/min, and in other embodiments from about 0.6 to about 2 dg/min per ASTM D-1238 at 230° C. and 2.16 kg load.

The linear low density polyethylene of one or more embodiments of this invention may be prepared by using a convention Ziegler Natta coordination catalyst system.

Useful linear low density polyethylene includes those that are commercially available. For example, linear low density polyethylene can be obtained under the tradename DOWLEX™ 2267G (Dow); or under the tradename DFDA-1010 NT7 (Dow); or under the tradename GA502023 (Lyondell).

In one or more embodiments, useful thermoplastic vulcanizates include those available under the tradename UNIPRENE (Teknor Apex)® and SANTOPRENE (ExxonMobil)®.

Useful ethylene alkyl-acrylates include those available under the tradename ELVALOY® (DuPont).

In one or more embodiments, block copolymers that may be used include styrene-butadiene block copolymers such as, but not limited to, styrene-butadiene-styrene block copolymers. These block copolymers may be blended with polyolefins such as polypropylene to form thermoplastic compositions that are useful in the practice of this invention.

In one or more embodiments, thermoplastic polyolefins may include propylene-based elastomers such as those available under the tradenames VISTAMAXX (ExxonMobil) and VERSIFY (Dow Chemical). In other embodiments, the thermoplastic polyolefin may include ethylene-based olefinic block copolymers, such as those commercially available under the tradename INFUSE (Dow Chemical).

In one or more embodiments, the thermoplastic polymer or polymers forming the thermoplastic matrix in which the expandable graphite is dispersed has a melt temperature below 200° C., in other embodiments below 180° C., in other embodiments below 160° C., and in other embodiments below 150° C.

In one or more embodiments, layers 20 and 22 may be characterized by a thickness of from about 15 to about 70, in other embodiments from about 20 to about 60 mils, and in other embodiments from about 30 to about 50.

In one or more embodiments, layers 20 and/or 22 may be homogenous; i.e., they may be monoextruded sheets or layers of thermoplastic material. In other embodiments, layers 20 and 22 may include two or more co-extruded layers. These individual co-extruded layers of any given layer of the laminate (e.g., layer 20 and/or 22) may be distinct from other coextruded layers within any respective laminate layer. Multi-layered, co-extruded thermoplastic roofing membranes are known in the art as described in U.S. Pat. Nos. 7,749,924, 7,632,763, 5,314,556, and U.S. Publication Nos 2012/0244340, 2009/0181216, 2009/0137168, 2007/0194482, and 2007/0193167, which are incorporated herein by reference.

Fabric Reinforcement

In one or more embodiments, reinforcing fabric 18 may include a woven, knitted, or non-woven fabric. In particular embodiments, reinforcing fabric 18 may be of the type of fabric generally known in the art for preparing roofing membranes. Useful reinforcing fabrics include warp-knit, weft-inserted fabrics, such as those that as are known in the art and, for example, described in U.S. Pat. Nos. 4,491,617, 4,539,254, 4,615,934, and 4,780,350, which are incorporated herein by reference. In one or more embodiments, the fabric reinforcement is a glass-containing reinforcement.

Fabric Backing

In one or more embodiments, fabric substrate 30 is a synthetic fabric including glass or polymeric fibers or filaments. In particular embodiments, fabric backing 30 is a fleece, such as a napped fleece. Fleece backings of the type that are useful as fabric backings for roofing membranes are generally known in the art as described in U.S. Pat. Nos. 4,996,812, 5,422,179, 5,981,030, and 6,502,360 which are incorporated herein by reference. In particular embodiments, fabric backing 30 is fleece prepared from polyester or polyolefin filaments such as those prepared from polyethylene terephthalate. In one or more embodiments, the fabric backing is a continuous filament polyester, needle punched, nonwoven fabric. In other embodiments, the fabric backing is a scrim reinforced nonwoven polyester mat. In yet other embodiments, the fabric backing is a glass fiber mat. In one or more embodiments, the fabric backing is a glass-reinforced polyester or polyolefin fabric.

In one or more embodiments, where the fabric backing is a glass fiber mat, the fabric may be characterized by a basis weight of at least 50, in other embodiments at least 60, and in other embodiments at least 70 g/m². In these or other embodiments, the glass fiber mat may be characterized by a basis weight of at most 150, in other embodiments at most 130, and in other embodiments at most 100 g/m². In one or more embodiments, the glass fiber mat may be characterized by a basis weight of from about 50 to about 150 g/m², in other embodiments from about 60 to about 130 g/m², and in other embodiments from about 70 to about 110 g/m².

In one or more embodiments, where the fabric backing is a glass fiber mat, the glass mat may be characterized by a thickness of at least 0.5 mm, in other embodiments at least 0.7 mm, and in other embodiments at least 1.0 mm. In these or other embodiments, the glass mat may be characterized by a thickness of at most 2.0 mm, in other embodiments at most 1.5 mm, and in other embodiments at most 1.2 mm. In one or more embodiments, the glass mat may be characterized by a thickness of from about 0.5 to about 2.0 mm, in other embodiments from about 0.7 to about 1.5 mm, and in other embodiments from about 1.0 to about 1.2 mm.

In one or more embodiments, where the fabric backing is a polyester or polyolefin (including glass reinforced) fleece, the fabric may be characterized by a basis weight of at least 70, in other embodiments at least 85, and in other embodiments at least 100 g/m². In these or other embodiments, the polyester fleece may be characterized by a basis weight of at most 400, in other embodiments at most 300, and in other embodiments at most 280 g/m². In one or more embodiments, the polyester fleece may be characterized by a basis weight of from about 70 to about 400 g/m², in other embodiments from about 85 to about 300 g/m², and in other embodiments from about 100 to about 280 g/m².

In one or more embodiments, where the fabric backing is a polyester or polyolefin (including glass reinforced) fleece, the fabric mat may be characterized by a thickness of at least 0.5 mm, in other embodiments at least 0.7 mm, and in other embodiments at least 1.0 mm. In these or other embodiments, the polyester fleece may be characterized by a thickness of at most 4.0 mm, in other embodiments at most 2.0 mm, and in other embodiments at most 1.5 mm. In one or more embodiments, the polyester fleece may be characterized by a thickness of from about 0.5 to about 4.0 mm, in other embodiments from about 0.7 to about 2.0 mm, and in other embodiments from about 1.0 to about 1.5 mm.

Expandable Graphite

In one or more embodiments, expandable graphite, which may also be referred to as expandable flake graphite, intumescent flake graphite, or expandable flake, includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 75% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the thermoplastic component of the thermoplastic membrane of the present invention, may be partially expanded. In one or more embodiments, the expandable graphite is not expanded, however, to a deleterious degree, which includes that amount or more of expansion that will deleteriously impact the ability to form the sheet product and/or the ability of the graphite to serve as flame retardant at desirable levels, which include those levels that allow proper formation of the sheet. In one or more embodiments, the expandable graphite is expanded to at most 60%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 12; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

Complimentary Flame Retardants

In one or more embodiments, the expandable graphite may be used in conjunction with a complementary flame retardant. In certain embodiments, the complementary flame retardant may be applied in conjunction with the expandable graphite. In other embodiments, the complementary flame retardant is included within a distinct or separate component of the composite.

In one or more embodiments, the complementary flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), melamine polyphosphate is available under the tradename Budit™ 3141 (Budenheim), and antimony oxide ($Sb_2O_3$) is commercially available under the tradename Fireshield™.

Examples of other complementary flame retardants include calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Method of Preparing

In one or more embodiments, the composites of the present invention are prepared by sandwiching expandable graphite between a thermoplastic membrane and a fabric backing. In one or more embodiments, the expandable graphite is placed into contact with the thermoplastic membrane while the thermoplastic membrane is at a temperature above which the thermoplastic polymers of the membrane can thermally bond to the fabric backing. Stated another way, the temperature of the thermoplastic membrane is sufficient to allow flow of the thermoplastic polymers, which not only allows the thermoplastic polymers to at least partially flow between and around the expandable graphite particles, but also allows the thermoplastic particles to flow and interlock with the fabric backing, which is likewise placed in contact with the thermoplastic membrane. As a result of this process, the fabric backing is thermally bonded to the thermoplastic membrane while at least partially sandwiching the expandable graphite particles between at least a portion of the membrane and at least a portion of the fabric backing.

Figure 3:
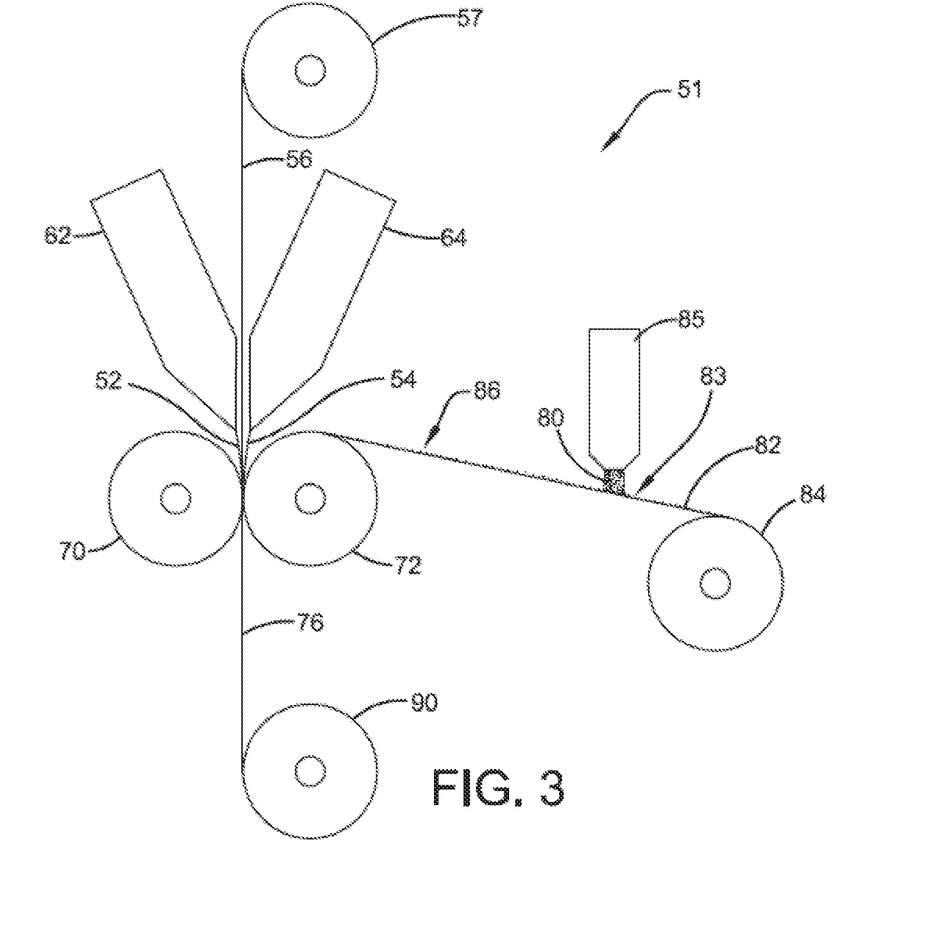
FIG. 3 is a schematical representation of a process for manufacturing thermoplastic membrane composites.

One or more processes of the present invention can be described with reference to FIG. 3. Here, process 51 includes first extruder 62, which produces first thermoplastic layer 52, which may also be referred to as first thermoplastic extrudate 52. Second extruder 64 produces second thermoplastic layer 54, which may also be referred to as second extrudate 54. Reinforcing scrim 56 is provided from roll 57 and is positioned between first extrudate 52 and second extrudate 54. Fabric backing 82 is provided from roll 84, and expandable graphite 80 is applied to planar surface 83 of fabric backing 82 from a dispensing apparatus 85 to provide an expandable graphite-dusted fabric backing 86. Expandable graphite-dusted fabric backing 86 is then positioned adjacent to second extrudate 54. First extrudate 52, second extrudate 54, reinforcing fabric 56, and graphite-dusted fabric backing 86 are mated at nip rolls 70, 72 to provide thermoplastic laminate structure 76, which includes first extrudate 52 being thermally laminated to second extrudate 54 with reinforcing fabric 56 disposed or sandwiched therebetween, and fabric backing 82 being thermally laminated or bonded to second extrudate 54 with expandable graphite 80 dispersed or sandwiched therebetween.

As a skilled person will appreciate, one or both of extruders 62, 64 can be replaced by multiple extruders that feed co-extrusion dyes so as to produce multi-layered co-extrudates. For example, extrudate 52 may include a multi-layer thermoplastic co-extrudate wherein the multiple layers are formed by co-extrusion and are therefore integral with one another as a result of the co-extrusion process. As a skilled person will appreciate, these various co-extruded layers may be distinguished from one another based upon the use of differing compositions within the various layers. Extrudate 54 may likewise include a multi-layered co-extrudate.

The skilled person will also appreciate that the temperature of first extrudate 52 and second extrudate 54 are sufficiently high to allow thermal bonding and lamination of first extrudate 52 to second extrudate 54 and/or to fabric 56, which is sandwiched therebetween, and/or to fabric backing 82, which is bonded to second extrudate 54. In one or more embodiments, the temperature of first extrudate 52, and optionally second extrudate 54, is above the melt temperature of the thermoplastic polymers within extrudate 52 at the time extrudate 52 is contacted with extrudate 54 at nip rolls 70, 72. In other embodiments, the temperature of second extrudate 54, and optionally the temperature of first extrudate 52, is above the melt temperature of the thermoplastic polymers contained within second extrudate 54 at the time that second extrudate 54 is contacted with first extrudate 52 within nip rolls 70, 72.

In one or more embodiments, the amount of expandable graphite 80 deposited or applied to planar surface 83 of fabric backing 82 may be quantified by the weight of expandable graphite applied per unit area. In one or more embodiments, the amount of expandable graphite 80 applied to surface 83 is greater than 4.5, in other embodiments greater than 7.5, and in other embodiments greater than 10 g/ft$^2$. In one or more embodiments, the amount of expandable graphite 80 applied to surface 83 is less than 22, in other embodiments less than 20, and in other embodiments less than 18 g/ft$^2$. In one or more embodiments, the amount of expandable graphite 80 applied to surface 83 is from about 4.5 to about 22, in other embodiments from about 7.5 to about 20, and in other embodiments from about 10 to about 18 g/ft$^2$.

As suggested above, the mating of expandable graphite-dusted fabric backing 86 to second extrudate 54 at nip rolls 70, 72 thermally bonds fabric 82 to second extrudate 54 while at least partially sandwiching expandable graphite 80 therebetween. In order to achieve this thermal bonding, the temperature of second extrudate 54, and more particularly the external surface of extrudate 54, should be of sufficient temperature to allow the thermoplastic polymers within extrudate 54 (at least those located at the surface deriving from extrudate 54) to flow into and mate with the fibers or strands of fabric backing 82. In one or more embodiments, the temperature of extrudate 54 is above the melt temperature of the polymers forming extrudate 54.

The mating of extrudate 54 with expandable graphite-dusted fabric backing 85 produces thermoplastic laminated structure 76. Using conventional techniques, thermoplastic laminated structure 76 may be cooled and then wound into rolls 90.

INDUSTRIAL APPLICABILITY

As described above, the membranes of one or more embodiments of the present invention may be employed as roofing membranes. These membranes include thermoplastic roofing membranes including those that meet the specifications of ASTM D-6878-03. These membranes maybe employed to cover flat or low/sloped roofs. These roofs are generally known in the art as disclosed in U.S. Ser. Nos. 60/586,424 and 11/343,466, and International Application No. PCT/US2005/024232, which are incorporated herein by reference.

Figure 4:
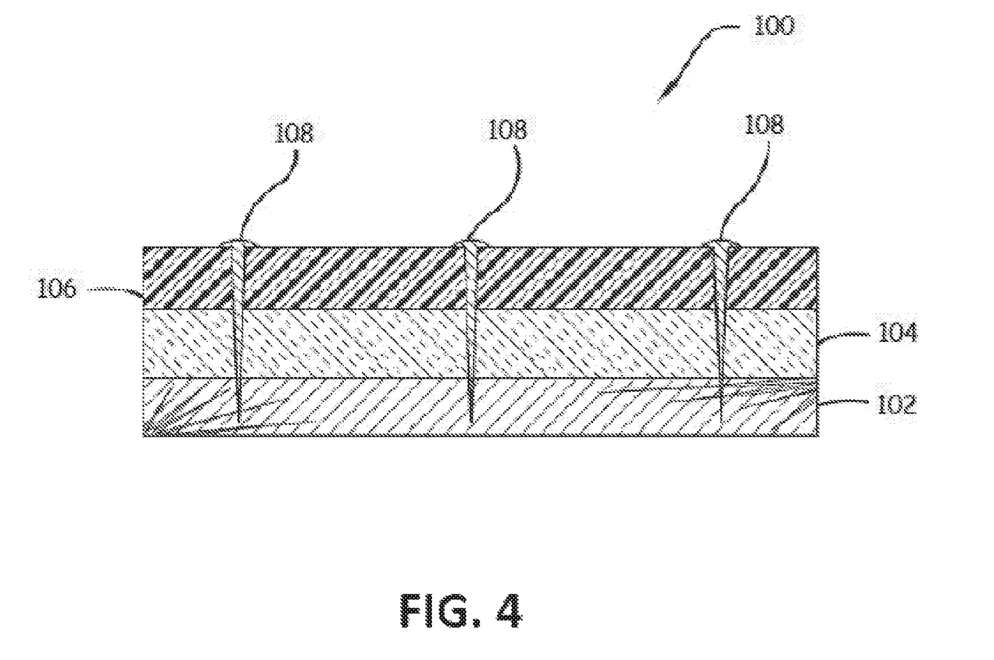
FIG. 4 is a perspective, cross sectional view of a mechanically-attached roof assembly according to embodiments of the present invention.

In one or more embodiments, the membranes of the present invention can advantageously be used to prepare mechanically-attached roofing systems. For example, as shown in FIG. 4, a mechanically-attached roofing system 100 includes roof deck 102, optional insulation layer 104, thermoplastic membrane composite 106, which is in accordance with the present invention, and a plurality of fasteners 108.

Advantageously, the process can be used to construct a mechanically-attached roofing system meeting the standards of UL and Factory Mutual for wind uplift (e.g., FM 4470).

The substrate to which the membrane may be mechanically attached may include a roof deck, which may include steel, concrete, and/or wood. In these or other embodiments, the membranes may be applied over additional materials, such as insulation boards and cover boards. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood. In yet other embodiments, the membranes may be applied over existing membranes. These existing membranes may include cured rubber systems such as EPDM membranes, thermoplastic polymers systems such as TPO membranes, or asphalt-based systems such as modified asphalt membranes and/or built roof systems. Regardless of any intervening materials, the membrane may ultimately be mechanically attached to the roof deck using known techniques.

Practice of this invention is not limited by the selection of any particular roof deck. Accordingly, the roofing systems herein can include a variety of roof decks. Exemplary roof decks include concrete pads, steel decks, wood beams, and foamed concrete decks.

Fasteners that are conventionally used in the art may be used in practice of this invention. In one or more embodiments, the mechanical fasteners which may be referred to as mechanical fastening systems, may include penetrating and non-penetrating mechanical fasteners. In one or more embodiments, these fastening systems include a penetrating fastening system that includes an anchoring member or fastener for penetrating the roof deck, such as a self-drilling and self-tapping screw-threaded fastener or pneumatically-driven nail or staple (optionally including an anchoring mechanism); these fasteners may include a driving head. The anchor member may include a complementary engaging element for dispersing load to the bonding assembly. In one or more embodiments, the complementary engaging element includes an elongated fastening bar or strip. In other embodiments, the complementary engaging element includes a circular plate. Useful mechanical fasteners are known in the art as described in U.S. Pat. Nos. 4,445,306, 4,074,501, 4,455,804, 4,467,581, 4,617,771, 4,744,187, 4,862,664 and 5,035,028 which are incorporated herein by reference. Useful non-penetrating fasteners include those described in U.S. Pat. Nos. 3,426,412, 4,619,094, and 4,660,347, which are incorporated herein by reference.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which is incorporated herein by reference.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

In other embodiments, the membrane composites of the present invention can be adhesively secured to a roof system (i.e. secured to an underlying roof substrate) by employing techniques well known in the art for securing fabric-backed roofing membranes. For example, a liquid-based adhesive can be applied to the roof surface and then the membrane composite can be unrolled onto the adhesive to contact the fabric backing to the adhesive. Various liquid-based adhesives can be employed including polyurethane, one part and two part adhesives (which are often foaming adhesives), as well as those bonding adhesives based upon polychloroprenes and neoprenes. Using conventional techniques, adjacent membranes are typically overlapped, and a lap seam is formed between overlapping membranes. In one or more embodiments, the lap seam can be formed by heat welding. Alternatively, a lap seam can be formed by using a solid tape or liquid adhesive (e.g., butyl-based adhesive).

Various modifications and alterations that do not depart from the scope and spirit of this invention will become apparent to those skilled in the art. This invention is not to be duly limited to the illustrative embodiments set forth herein.

What is claimed is:

1. A thermoplastic membrane composite comprising:
   (i) a planar thermoplastic body including first and second thermoplastic layers laminated to each other and including a fabric reinforcement disposed between said first and second thermoplastic layers, said first thermoplastic layer having first and second opposed planar surfaces, said second thermoplastic layer having first and second opposed planar surfaces, and wherein said fabric reinforcement is disposed between said second planar surface of said first thermoplastic layer and said first planar surface of said second thermoplastic layer where the first and second thermoplastic layers are formed of polyolefin or polyvinyl chloride;
   (ii) a fabric backing having first and second opposed planar surfaces, said first planar surface of said fabric backing fixedly attached to said first planar surface of said first thermoplastic layer thereby forming an interface between said first planar surface of said first thermoplastic layer and said fabric backing; and
   (iii) expandable graphite located within said first thermoplastic layer at a concentration of greater than 4.5 g/ft$^2$ and within said interface; wherein said expandable graphite is at a maximum concentration at or near said first planar surface of said fabric backing and at a minimum concentration at said second planar surface of said fabric backing, and wherein said polyolefin or said polyvinyl chloride serve as a matrix in which at least a portion of the expandable graphite is dispersed.

2. The membrane composite of claim 1, where said expandable graphite is disposed in a concentration gradient where said expandable graphite is at a maximum concentration at or near said first planar surface of said first thermoplastic layer and at a minimum concentration at said second planar surface of said first thermoplastic layer.

3. The membrane composite of claim 1, where at least one of said fabric backing and said fabric reinforcement is a glass-containing fabric.

4. The membrane composite of claim 1, where said fabric backing is fixedly attached to said first planar surface of said first thermoplastic layer through thermal bonding.

5. The membrane composite of claim 1, where said fabric backing is a glass-containing fabric backing.

6. The membrane composite of claim 1, wherein the membrane is secured to a roof substrate with said second opposed surface of said fabric backing being proximate to the roof substrate and said first thermoplastic layer being opposite said fabric backing relative to the roof substrate.

7. A process for forming the thermoplastic membrane composite of claim 1, the process comprising:
   (i) extruding a first thermoplastic layer;
   (ii) extruding a second thermoplastic layer;
   (iii) positioning a reinforcing fabric between the first thermoplastic layer and the second thermoplastic layer;
   (iv) providing a fabric backing;
   (v) applying expandable graphite to a first planar surface of the fabric backing;
   (vi) positioning the first planar surface of the fabric backing adjacent to a surface of the second thermoplastic layer opposite the reinforcing fabric to thereby sandwich the expandable graphite between the fabric backing and the second thermoplastic layer;
   (vii) laminating the first thermoplastic layer to the second thermoplastic layer to thereby sandwich the reinforcing scrim therebetween; and
   (viii) thermally bonding the second thermoplastic layer to the fabric backing.

8. The process of claim 7, where said step of applying expandable graphite to the fabric backing includes applying greater 4.5 g/ft$^2$ expandable graphite.

9. The process of claim 7, where said step of positioning the reinforcing fabric between the first thermoplastic layer and the second thermoplastic layer includes first mating the reinforcing fabric to the first thermoplastic layer and then subsequently mating the second thermoplastic layer to the reinforcing fabric.

* * * * *